(12) United States Patent
Clark et al.

(10) Patent No.: US 10,816,059 B2
(45) Date of Patent: Oct. 27, 2020

(54) BALANCE SHAFT HAVING REDUCED MASS AND INERTIA

(71) Applicant: American Axle & Manufacturing, Inc., Detroit, MI (US)

(72) Inventors: Stephen A. Clark, Plymouth, MI (US); John C. Geis, Northville, MI (US); Carl E. Holmblad, Temperance, MI (US); Craig Lawrence McEachran, LaSalle (CA)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 16/855,057

(22) Filed: Apr. 22, 2020

(65) Prior Publication Data

US 2020/0246426 A1    Aug. 6, 2020

Related U.S. Application Data

(63) Continuation of application No. 15/981,762, filed on May 21, 2018, now Pat. No. 10,663,033.

(60) Provisional application No. 62/531,671, filed on Jul. 12, 2017.

(51) Int. Cl.
  *F16F 15/26* (2006.01)
  *F16C 3/22* (2006.01)

(52) U.S. Cl.
  CPC .............. *F16F 15/267* (2013.01); *F16C 3/22* (2013.01); *Y10T 74/2183* (2015.01); *Y10T 74/2184* (2015.01); *Y10T 464/50* (2015.01)

(58) Field of Classification Search
  CPC ........ F16F 15/26; F16F 15/264; F16F 15/267; Y10T 74/2183; Y10T 74/2184; Y10T 464/50

USPC ...................... 123/192.1, 192.2; 74/603, 604
  See application file for complete search history.

(56) References Cited

U.S. PATENT DOCUMENTS

| | | |
|---|---|---|
| 1,898,459 A | 2/1933 | Newcomb |
| 2,407,102 A | 9/1946 | Ryder |
| 2,729,179 A | 1/1956 | Attwood |
| 3,402,707 A | 9/1968 | Heron |
| 3,760,694 A | 9/1973 | Lieb |
| 4,174,698 A | 11/1979 | Dupin |
| 4,195,613 A | 4/1980 | Brett et al. |
| 4,565,169 A | 1/1986 | Suzuki |
| 4,690,111 A | 9/1987 | Kohno et al. |
| 4,833,940 A | 5/1989 | Ito |
| 5,189,993 A | 3/1993 | Schneider |
| 5,461,940 A | 10/1995 | Morita |

(Continued)

FOREIGN PATENT DOCUMENTS

| | | |
|---|---|---|
| DE | 102016001538 A1 | 10/2016 |
| DE | 102016001541 A1 | 10/2016 |

(Continued)

*Primary Examiner* — Jacob M Amick
*Assistant Examiner* — Michael A Kessler
(74) *Attorney, Agent, or Firm* — Burris Law, PLLC

(57) ABSTRACT

A balance weight having one or more journals with a reduced mass portion disposed between a pair of journal portions that define circumferentially extending bearing surfaces. The reduced mass portion has a body, which defines a circumferentially extending bearing surface that is concentric with the bearing surfaces on the journal portions, and at least one stiffening structure that is configured to resist flexing of the journal portions relative to one another due to the transmission of bending loads through the balance shaft.

9 Claims, 9 Drawing Sheets

(56) References Cited

U.S. PATENT DOCUMENTS

| | | |
|---|---|---|
| 6,305,339 B1 | 10/2001 | Iwata et al. |
| 6,655,340 B2 | 12/2003 | Garza |
| 6,763,586 B2 | 7/2004 | Schliemann et al. |
| 7,647,910 B2 | 1/2010 | Solfrank |
| 2003/0075136 A1 | 4/2003 | Inaba |
| 2004/0079351 A1 | 4/2004 | Summers et al. |
| 2005/0284254 A1 | 12/2005 | Hawkins et al. |
| 2006/0037576 A1 | 2/2006 | Nakayama |
| 2007/0062329 A1 | 3/2007 | Hofheinz |
| 2007/0079786 A1 | 4/2007 | Osman |
| 2007/0177837 A1 | 8/2007 | Tisch et al. |
| 2007/0261657 A1 | 11/2007 | Marzy et al. |
| 2008/0047521 A1 | 2/2008 | Koyama |
| 2009/0279822 A1 | 11/2009 | Solfrank |
| 2009/0308344 A1 | 12/2009 | Ihlemann et al. |
| 2010/0019940 A1 | 6/2010 | Tisch |
| 2013/0068187 A1 | 3/2013 | Clever |
| 2013/0139779 A1 | 6/2013 | Bergmann et al. |
| 2014/0311280 A1 | 10/2014 | Solfrank |

FOREIGN PATENT DOCUMENTS

| | | |
|---|---|---|
| GB | 844071 A | 8/1960 |
| JP | S5646139 A | 4/1981 |
| JP | S57102743 U | 6/1982 |
| WO | WO-0012906 A1 | 2/1999 |
| WO | WO-2010063677 A1 | 6/2010 |

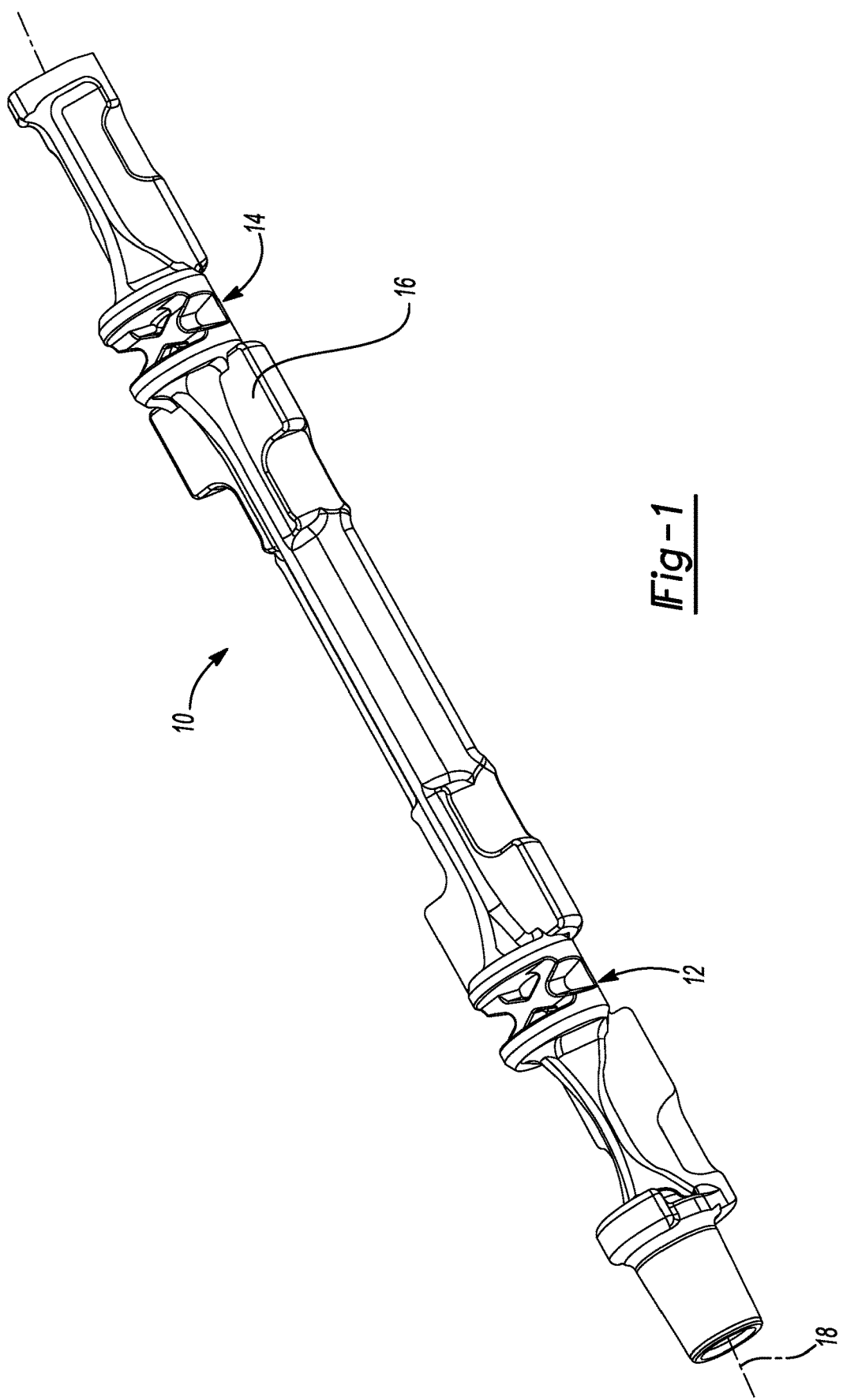

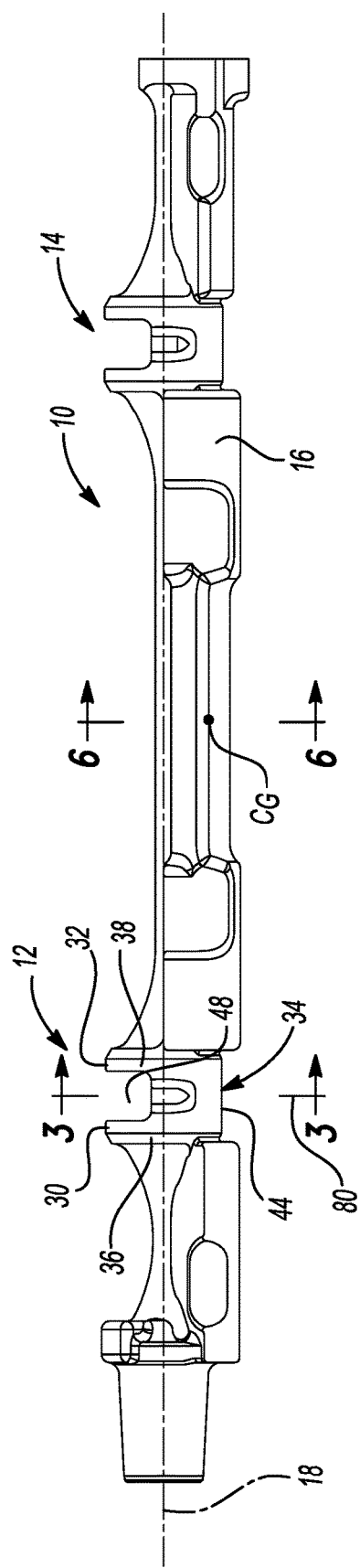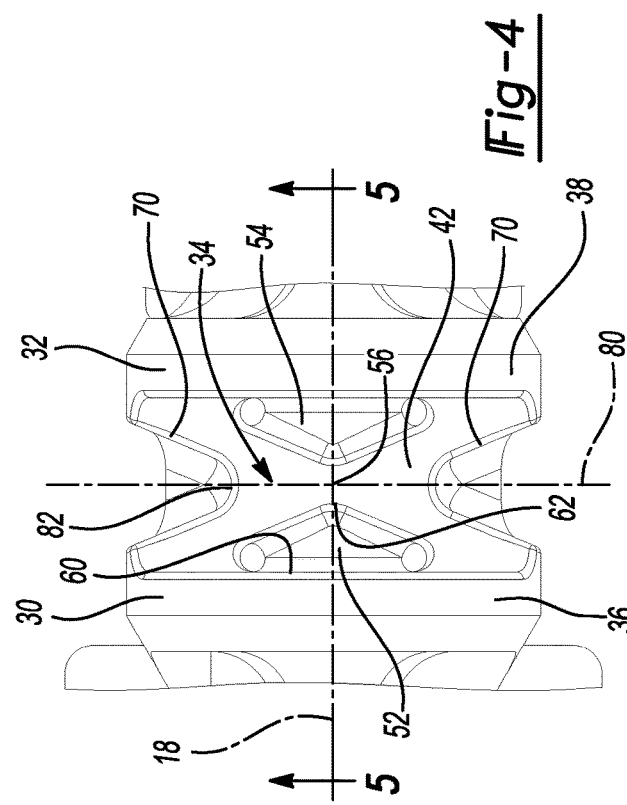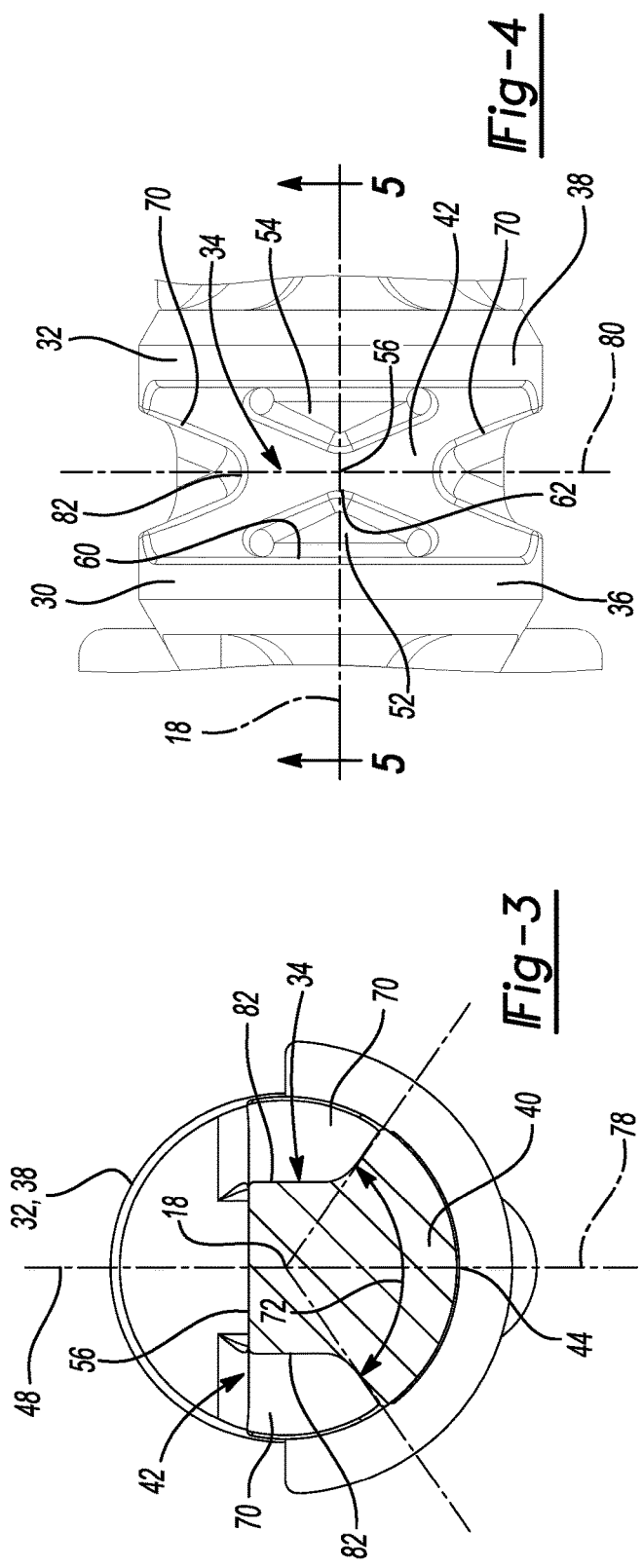

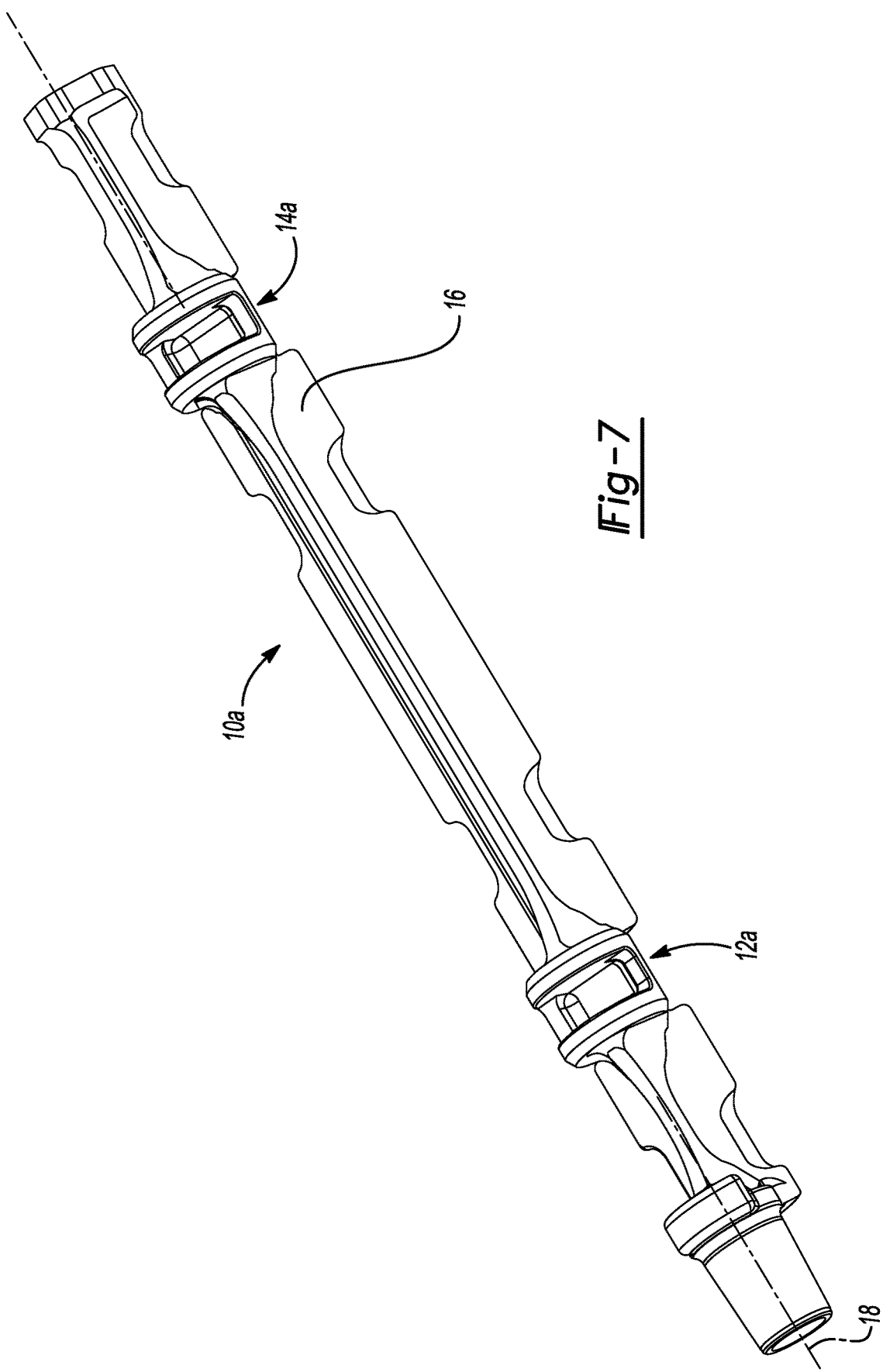

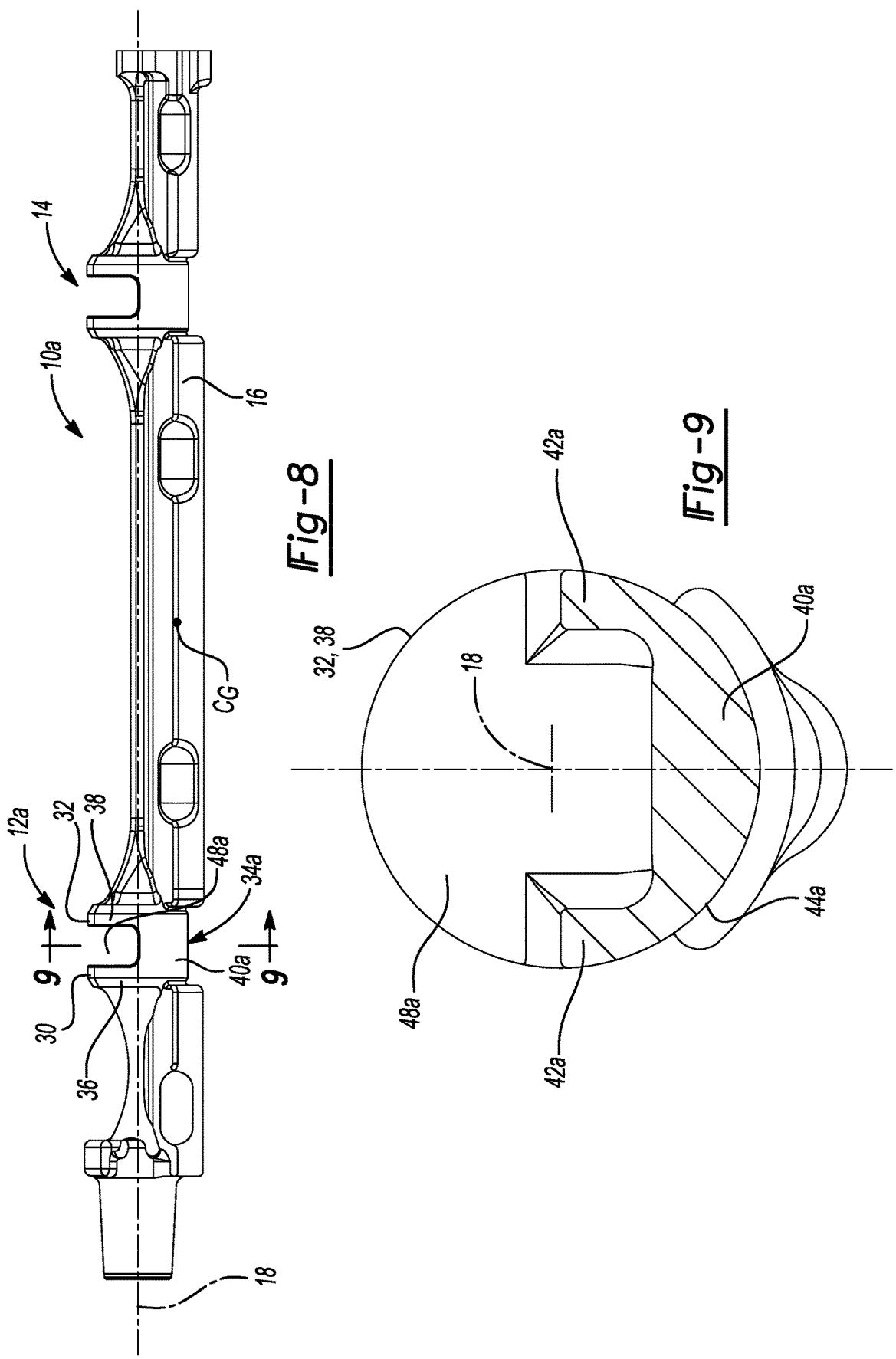

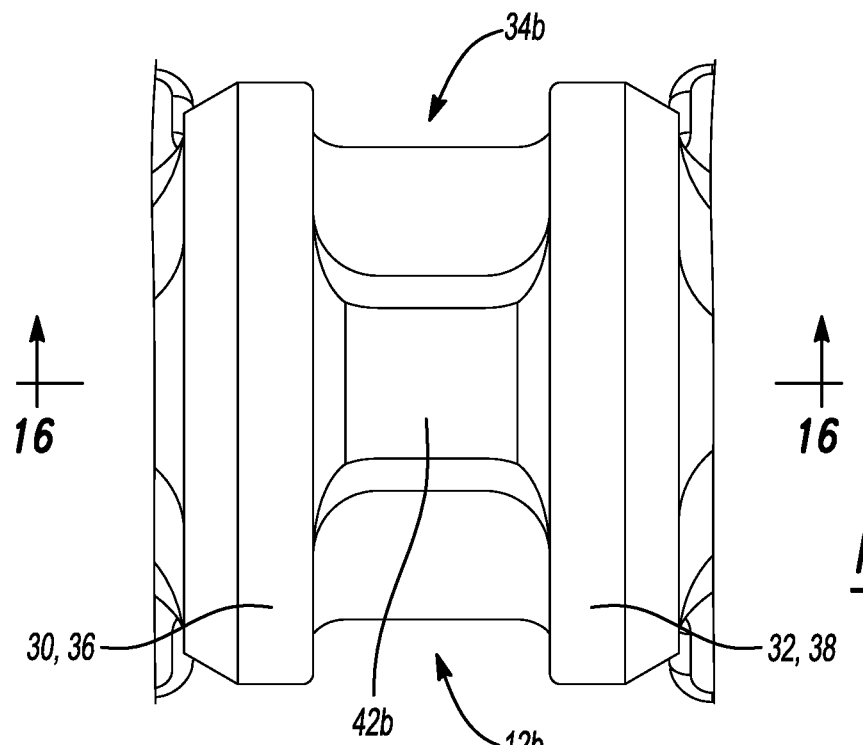
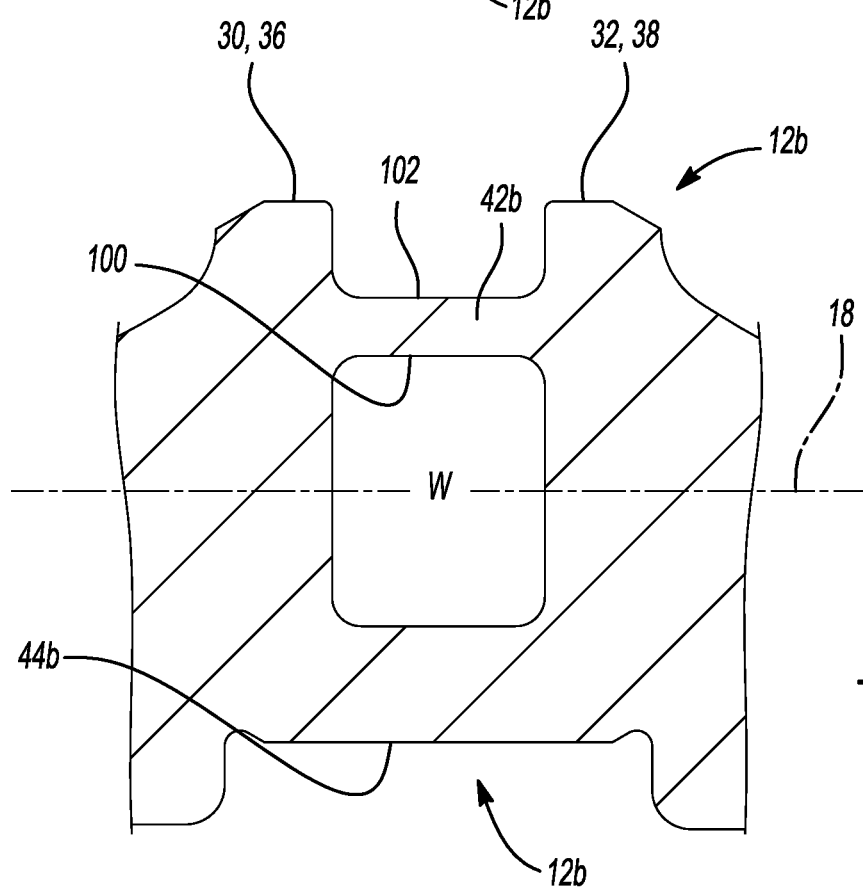

BALANCE SHAFT HAVING REDUCED MASS AND INERTIA

CROSS-REFERENCE TO RELATED APPLICATIONS

This application is a continuation of U.S. application Ser. No. 15/984,762 filed May 21, 2018 and claims the benefit of U.S. Provisional Patent Application No. 62/531,671 filed Jul. 12, 2017. The disclosure of each of the above-referenced applications is incorporated by reference as if fully set forth in detail herein.

FIELD

The present disclosure relates to a balance shaft having reduced mass and inertia.

BACKGROUND

This section provides background information related to the present disclosure which is not necessarily prior art.

Balance shafts are commonly employed to counteract vibrations in internal combustion engines that are not inherently balanced. A typical balance shaft can include one or more journals, which establish the rotational axis of the balance shaft, and one or more counterweights that can each be sized, shaped and positioned relative to the rotational axis so as to place mass at a predetermined offset from the rotational axis.

While the known balance shaft configurations are suited for their intended purpose, it is desirable that the overall mass and inertia of the balance shaft be minimized. Accordingly, there is a need in the art for a reduced mass balance shaft with increased stiffness.

SUMMARY

This section provides a general summary of the disclosure, and is not a comprehensive disclosure of its full scope or all of its features.

In one form, the present teachings provide a balance shaft having first and second journals and at least one counterweight. The first and second journals define a rotational axis. The at least one counterweight is fixedly coupled to the first and second journals. The first journal defines a first journal portion, a second journal portion and a reduced mass portion that is disposed along the rotational axis between the first and second journal portions. The first journal portion defines a first circumferentially extending bearing surface and the second journal portion defines a second circumferentially extending bearing surface. The reduced mass portion is disposed axially between the first and second circumferentially extending bearing surfaces and includes a body and a stiffening structure. The body is fixedly coupled to the first and second journal portions and defines a third circumferentially extending bearing surface that is concentric with the first and second circumferentially extending bearing surfaces. The stiffening structure intersects the body and the first and second journal portions and terminates radially inwardly of the first circumferentially extending bearing surface such that a void space is disposed between the first and second journal portions at a location that is radially outwardly of the stiffening structure. The stiffening structure defines a first pocket, which is disposed adjacent the first journal portion and a second pocket, which is disposed adjacent the second journal portion. The first and second pockets are spaced apart from one another along the rotational axis to form a land there between.

In another form, the present teachings provide balance shaft having first and second journals and at least one counterweight. The first and second journals define a rotational axis. The at least one counterweight is fixedly coupled to the first and second journals. The first journal defines a first journal portion, a second journal portion and a reduced mass portion that is disposed along the rotational axis between the first and second journal portions. The first journal portion defines a first circumferentially extending bearing surface and the second journal portion defines a second circumferentially extending bearing surface. The reduced mass portion is disposed axially between the first and second circumferentially extending bearing surfaces and includes a body and at least one stiffening structure. The body is fixedly coupled to the first and second journal portions and at least partly defines a third circumferentially extending bearing surface that is concentric with the first and second circumferentially extending bearing surfaces. The at least one stiffening structure is fixedly coupled to the first and second journal portions and terminates radially inwardly of the first circumferentially extending bearing surface such that a void space is disposed between the first and second journal portions at a location that is radially outwardly of the stiffening structure. In a cross-section of the balance shaft taken perpendicular to the rotational axis, the void space extends between the rotational axis and the body.

In another form, the present disclosure provides a balance shaft having first and second journals, which define a rotational axis, and at least one counterweight that is fixedly coupled to the first and second journals. The first journal defines a first journal portion, a second journal portion and a reduced mass portion that is disposed along the rotational axis between the first and second journal portions. The first journal portion defines a first circumferentially extending bearing surface, while the second journal portion defines a second circumferentially extending bearing surface. The reduced mass portion has a body and a stiffening structure. The body is fixed to and spans between the first and second journal portions. The body is shaped as a cylindrical segment having a third circumferentially extending bearing surface and an inboard surface. The inboard surface is offset from the rotational axis and intersects the third circumferentially extending bearing surface. The stiffening structure is fixed to and spans between the first and second journal portions. The stiffening structure is disposed radially inside of a cylindrically-shaped perimeter defined by the first, second and third circumferentially extending bearing surfaces. The stiffening structure is offset from the rotational axis such that the rotational axis is disposed between the body and the stiffening structure so that a void space is formed laterally through the first journal. The void space is bounded on four sides by an inboard surface of the stiffening structure, the inboard surface of the body, an interior surface of the first journal portion and an interior surface of the second journal portion.

In yet another form, the present disclosure provides a a balance shaft having first and second journals, which define a rotational axis, and at least one counterweight that is fixedly coupled to the first and second journals. The first journal defines a first journal portion, a second journal portion and a reduced mass portion that is disposed along the rotational axis between the first and second journal portions. The first journal portion defines a first circumferentially extending bearing surface, while the second journal portion defines a second circumferentially extending bearing surface. The reduced mass portion has a body that is fixed to and spans between the first and second journal portions. The body has a third circumferentially extending bearing surface and an inboard surface. The first journal has a cylindrically-shaped perimeter that is defined by the first, second and third circumferentially extending bearing surfaces. The inboard surface of the body is disposed between the rotational axis and the third circumferentially extending bearing surface. At least a portion of the inboard surface of the body is concave in shape in a plane that is perpendicular to the rotational axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a first balance shaft constructed in accordance with the teachings of the present disclosure;

FIG. 2 is a side elevation view of the balance shaft of FIG. 1;

FIG. 3 is a section view taken along the line 3-3 of FIG. 2;

FIG. 4 is top plan view of a portion of the balance shaft of FIG. 1;

FIG. 7 is a perspective view of a second balance shaft constructed in accordance with the teachings of the present disclosure;

FIG. 8 is a side elevation view of the balance shaft of FIG. 7;

FIG. 9 is a section view taken along the line 9-9 of FIG. 8;

FIG. 15 is top plan view of a portion of the balance shaft of FIG. 12; and

FIG. 16 is a section view taken along the line 16-16 of FIG. 15.

Corresponding reference numerals indicate corresponding parts throughout the several views of the drawings.

DETAILED DESCRIPTION

Figure 5:
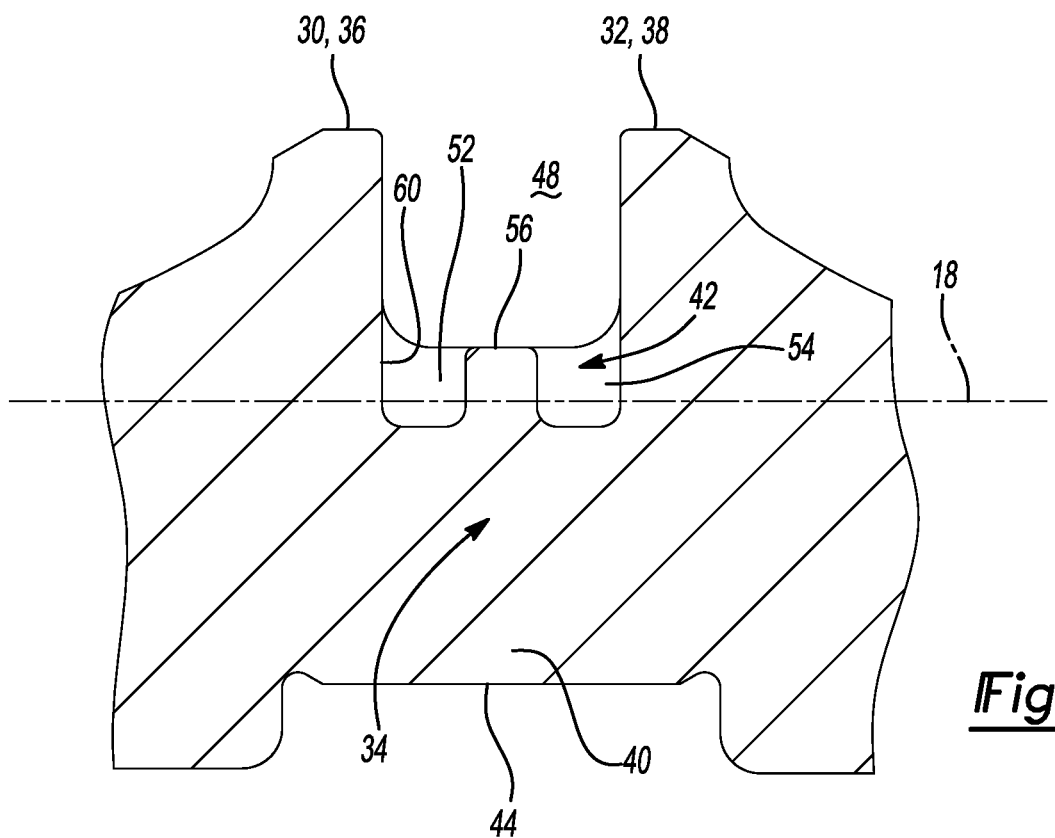
FIG. 5 is a section view taken along the line 5-5 of FIG. 4.

With reference to FIGS. 1 and 2 of the drawings, a first balance shaft constructed in accordance with the teachings of the present disclosure is generally indicated by reference numeral 10. The balance shaft 10 can include first and second journals 12 and 14 and at least one counterweight 16.

Figure 6:
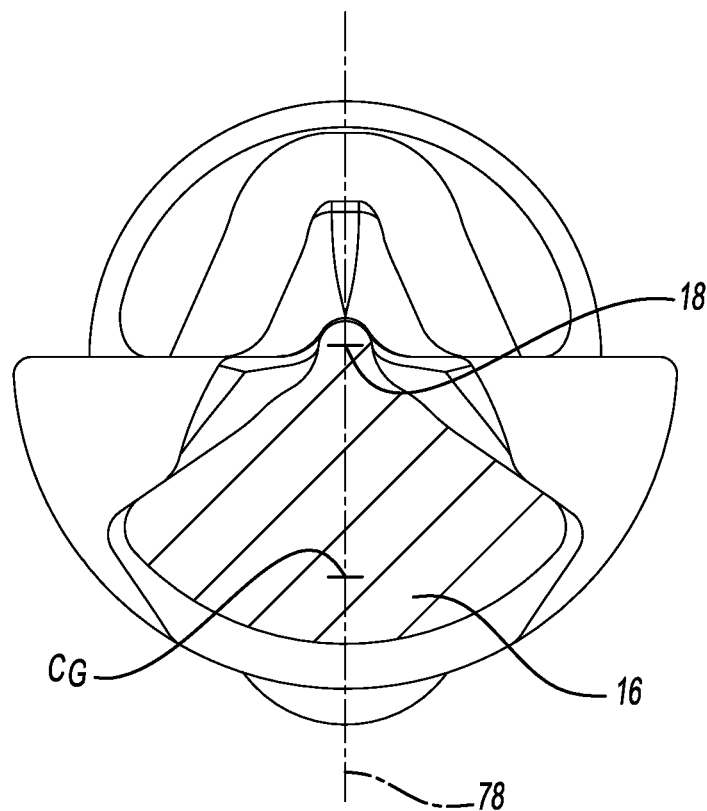
FIG. 6 is a section view taken along the line 6-6 of FIG. 2.
Figure 10:
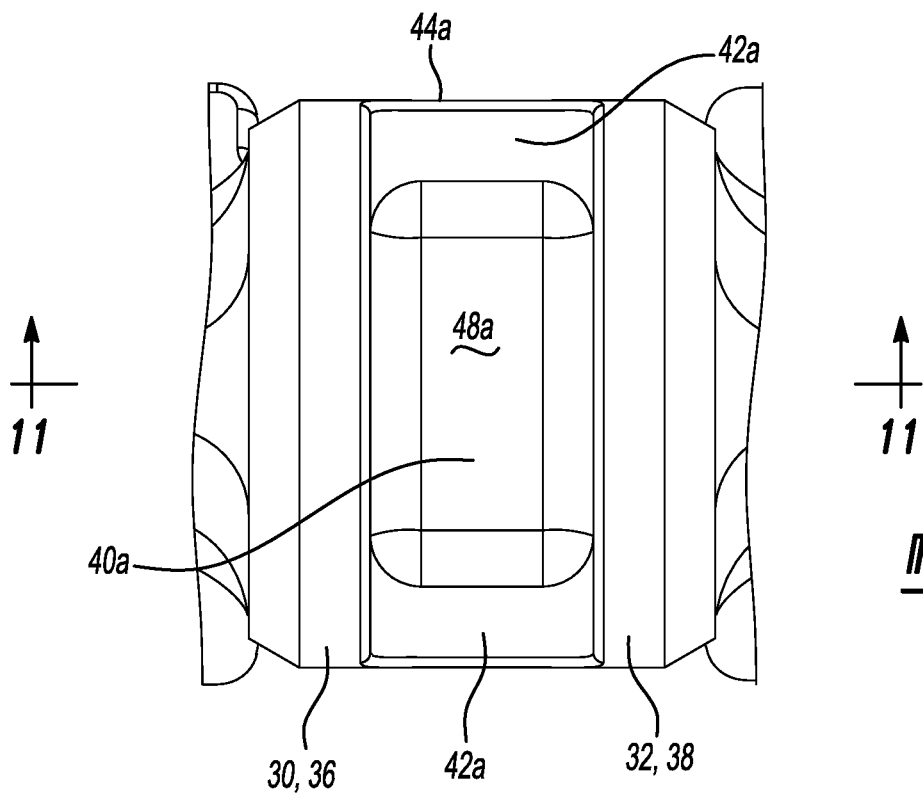
FIG. 10 is top plan view of a portion of the balance shaft of FIG. 7.
Figure 11:
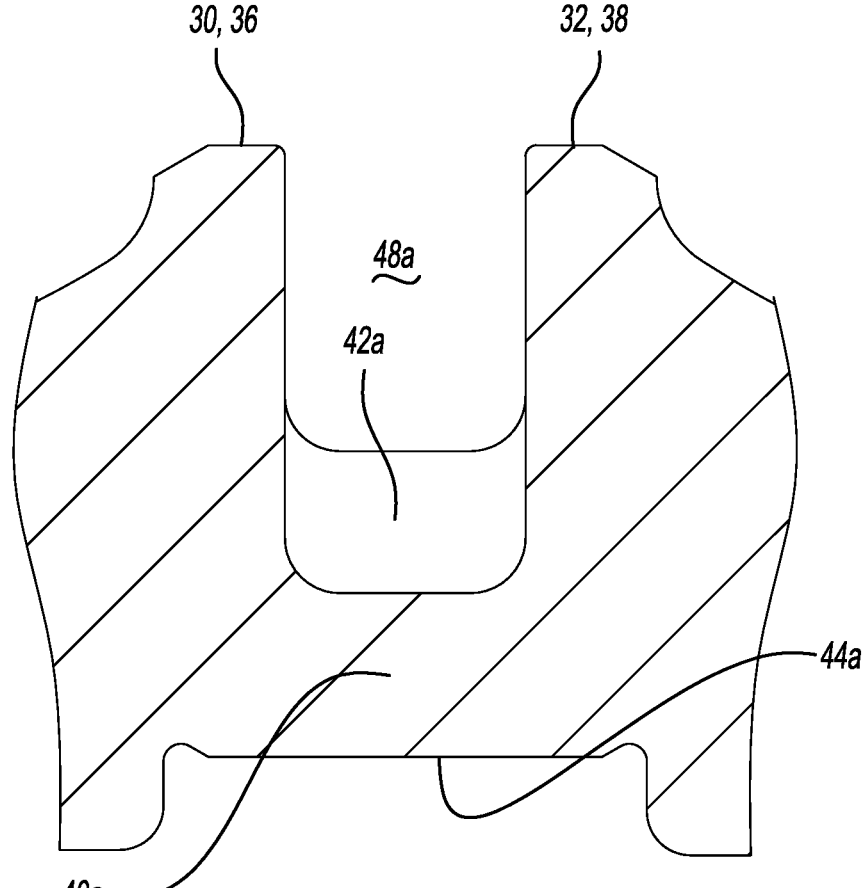
FIG. 11 is a section view taken along the line 11-11 of FIG. 10.
Figure 12:
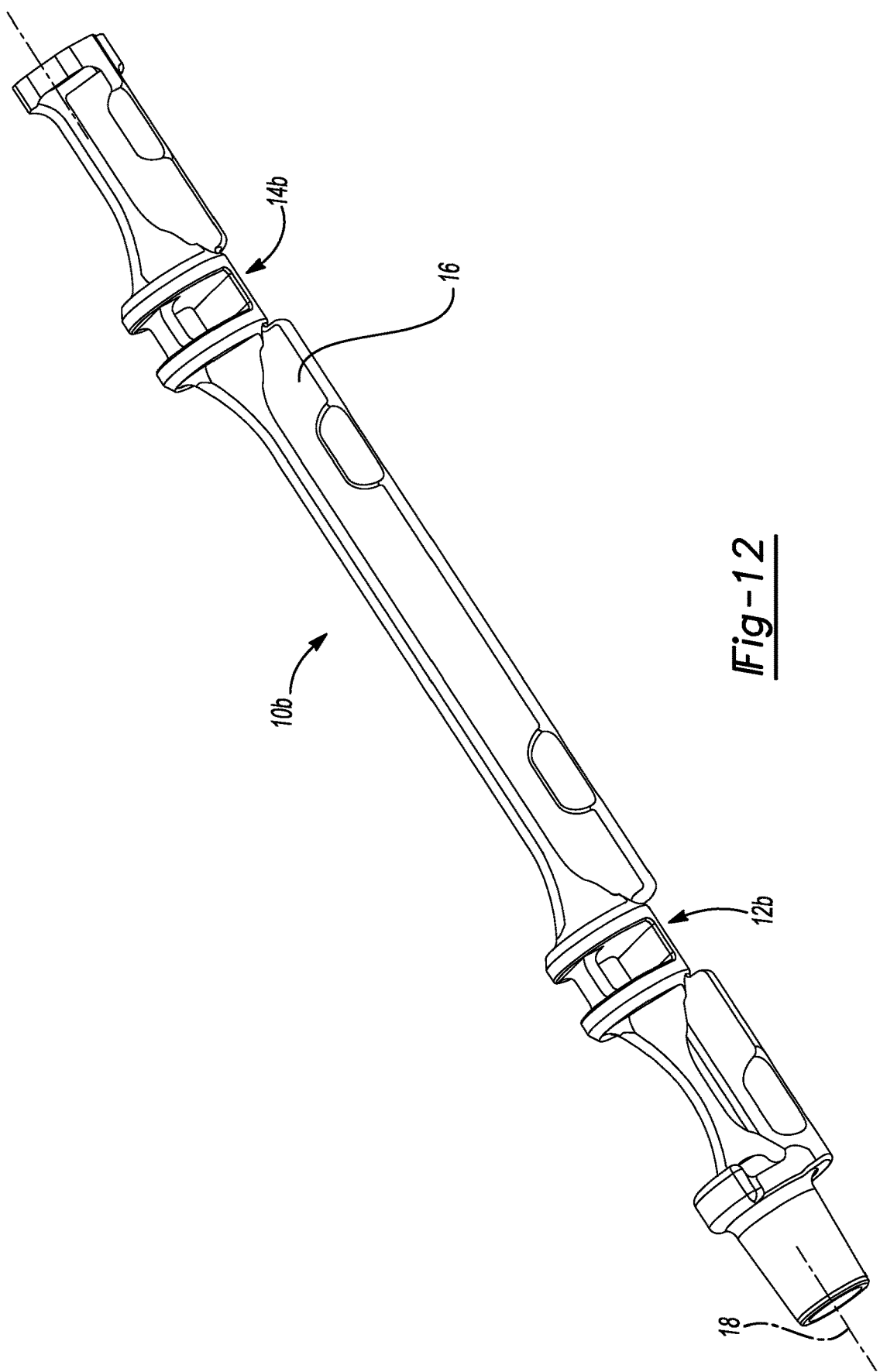
FIG. 12 is a perspective view of a third balance shaft constructed in accordance with the teachings of the present disclosure.
Figure 13:
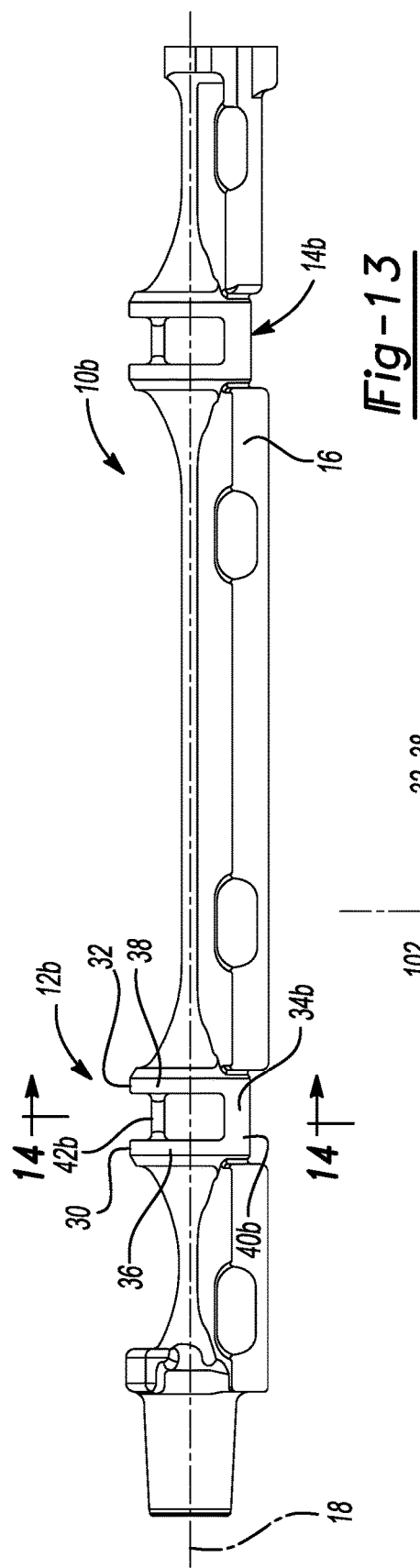
FIG. 13 is a side elevation view of the balance shaft of FIG. 12.
Figure 14:
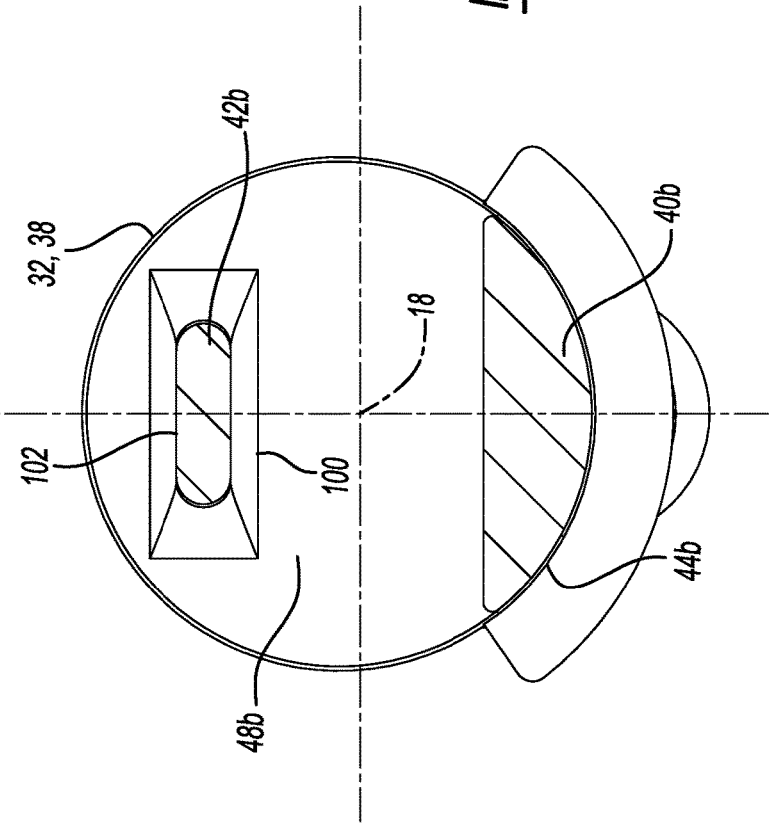
FIG. 14 is a section view taken along the line 14-14 of FIG. 13.

The first and second journals 12 and 14 can cooperate to define a rotational axis 18 about which the balance shaft 10 is intended to rotate. With additional reference to FIG. 6, the at least one counterweight 16 can be conventional in its construction. In the example provided, the balance shaft 10 is a "linear" balance shaft and as such, the at least one counterweight 16 is fixedly coupled to the first and second journals 12 and 14 and is sized and positioned to offset a center of gravity CG of the balance shaft 10 from the rotational axis 18. It will be understood, however, that the balance shaft 10 could be configured as a "couple type" balance shaft in which case the counterweights 16 would be fixedly coupled to the first and second journals 12 and 14 in a manner that does not offset the center of gravity of the balance shaft from the rotational axis 18. The balance shaft 10 can be unitarily and integrally formed in one or more desired operations, such as machining, casting or forging, but it will be appreciated that the balance shaft 10 could be formed as an assembly (e.g., with the counterweight(s) 16 being assembled to a remaining portion of the balance shaft 10).

The first and second journals 12 and 14 can be formed differently from one another, but in the example provided, the first and second journals 12 and 14 are identical in their construction. As such, only a discussion of the first journal 12 will be provided herein.

With reference to FIGS. 2 through 5, the first journal 12 can define a first journal portion 30, a second journal portion 32 and a reduced mass portion 34 that is disposed along the rotational axis 18 between the first and second journal portions 30 and 32. The first journal portion 30 can define a first circumferentially extending bearing surface 36 and the second journal portion 32 can define a second circumferentially extending bearing surface 38. In the particular example provided, both the first and second circumferentially extending bearing surfaces 36 and 38 extend fully about the rotational axis 18, but it will be appreciated that one or both of the first and second circumferentially extending bearing surfaces 36 and 38 can extend only partly about the rotational axis 18.

The reduced mass portion 34 can be disposed axially between the first and second circumferentially extending bearing surfaces 36 and 38 and can include a body 40 and a stiffening structure 42. The body 40 can be fixedly coupled to (e.g., intersect) the first and second journal portions 30 and 32 and can define a third circumferentially extending bearing surface 44 that is concentric (e.g., coincide or co-extend) with the first and second circumferentially extending bearing surfaces 36 and 38. The stiffening structure 42 can intersect the body 40 and the first and second journal portions 30 and 32 and can terminate radially inwardly of the first circumferentially extending bearing surface 36 such that a void space 48 is disposed between the first and second journal portions 30 and 32 at a location that is radially outwardly of the stiffening structure 42.

The stiffening structure 42 is configured to stiffen the first journal 12 to resist flexing of the first journal portion 30 relative to the second journal portion 32 due to the transmission of bending loads through the balance shaft 10. The stiffening structure 42 can define a first pocket 52, which is disposed adjacent the first journal portion 30, and a second pocket 54 that is disposed adjacent the second journal portion 32. The first and second pockets 52 and 54 can be spaced apart from one another along the rotational axis 18 to form a land 56 there between.

The first and second pockets 52 and 54 can be formed in any desired manner and need not be configured in an identical manner. For example, at least one of the first and second pockets 52 and 54 can be shaped as a portion of a prism, such as a triangular prism. In the example provided, the first pocket 52 is formed as a right triangular prism, the first pocket 52 is oriented so that a surface 60 of the first pocket 52 is disposed proximate the first journal portion 30 and a vertex 62 of the first pocket 52 is disposed proximate the land 56, and the second pocket 54 is configured as a mirror image of the first pocket 52 (i.e., the first pocket 52 is mirrored about a plane that is perpendicular to the rotational axis 18 and which bisects the land 56 to form the second pocket 54). Alternatively, one or both of the first and second pockets 52 and 54 could be formed as a portion of a pyramid, cone, cylinder or polyhedron (e.g., a complex polyhedron, such as a regular polyhedron). Also alternatively, at least one of the first and second pockets 52 and 54 could be formed with at least one curved surface (not shown). The at least one curved surface could be shaped such that a conic section is formed by the intersection of the at least one curved surface and a plane that is taken through the stiffening structure 42.

In the example provided, a width of the land 56 as measured in a direction parallel to the rotational axis 18 can be larger than a width of the first pocket 52 as measured in the direction parallel to the rotational axis 18. It will be appreciated, however, that width of the land 56 could be smaller than the width of one or both of the first and second pockets 52 and 54.

Optionally, a pair of circumferentially extending notches 70 can be formed in the reduced mass portion 34 to further reduce the mass of the first journal 12 and aid in placing the center of gravity CG of the balance shaft 10 in a desired location. The circumferentially extending notches 70 can intersect the third circumferentially extending bearing surface 44 such that the third circumferentially extending bearing surface 44 extends between the circumferentially extending notches 70 through a predetermined angle 72. The predetermined angle 72 can be greater than or equal to sixty degrees, and is more preferably greater than or equal to ninety degrees. The predetermined angle 72 can be oriented such that it is bisected by a first plane 78 that is perpendicular to the rotational axis 18, is intersected at a single point by the rotational axis 18 and optionally includes the center of gravity CG of the balance shaft 10. The circumferentially extending notches 70 can be formed in any desired manner. In the example provided, the circumferentially extending notches 70 are generally V-shaped having a vertex 82 that is disposed in a second plane 80 that is perpendicular to the first plane 78. Optionally, one or more passageways may be formed through stiffening structures 42 in order to allow lubricant to escape the pockets 52 and/or 54, thus preventing buildup and unintended imbalance.

It will be appreciated that references to a "plane" made herein refer to a plane that exists in a two-dimensional space (i.e., a Euclidian plane).

With reference to FIGS. 7 through 11, a second balance shaft constructed in accordance with the teachings of the present disclosure is generally indicated by reference numeral 10a. The balance shaft 10a is generally similar to the balance shaft 10 of FIG. 1, except for the configuration of the first and second journals 12a and 14a. As the second journal 14a is identical to the first journal 12a in this example, only a discussion of the first journal 12a will be provided herein.

The first journal 12a can define a first journal portion 30, a second journal portion 32 and a reduced mass portion 34a that can be disposed along the rotational axis 18 between the first and second journal portions 30 and 32. The first journal portion 30 defines a first circumferentially extending bearing surface 36, while the second journal portion 32 defines a second circumferentially extending bearing surface 38.

The reduced mass portion 34a can be disposed axially between the first and second circumferentially extending bearing surfaces 36 and 38 and can include a body 40a and at least one stiffening structure 42a. The body 40a can be fixedly coupled to the first and second journal portions 30 and 32 and can at least partly define a third circumferentially extending bearing surface 44a that is concentric with the first and second circumferentially extending bearing surfaces 36 and 38. The at least one stiffening structure 42a can be fixedly coupled to the first and second journal portions 30 and 32 and can terminate radially inwardly of the first circumferentially extending bearing surface 36 such that a void space 48a is disposed between the first and second journal portions 30 and 32 at a location that is radially outwardly of the at least one stiffening structure 42a. In a cross-section of the balance shaft 10a taken perpendicular to the rotational axis 18, the void space 48a extends between the rotational axis 18 and the body 40a.

In the particular example provided, two stiffening structures 42a are provided that intersect opposite circumferential ends of the body 40a. In this example, a portion of the third circumferentially extending bearing surface 44a is formed on each of the stiffening structures 42a. Optionally, one or more passageways may be formed through stiffening structures 42a in order to allow lubricant to escape the void space 48a, thus preventing buildup and unintended imbalance. It is further optionally contemplated that the stiffening structures 42 and 42a may be superimposed, which would increase the number of pockets and/or could increase the stiffness of the reduced mass portion.

With reference to FIGS. 12 through 16, a third balance shaft constructed in accordance with the teachings of the present disclosure is generally indicated by reference numeral 10b. The balance shaft 10b is generally similar to the balance shaft 10a of FIG. 7, except for the configuration of the first and second journals 12b and 14b. As the second journal 14b is identical to the first journal 12b in this example, only a discussion of the first journal 12b will be provided herein.

The first journal 12b can define a first journal portion 30, a second journal portion 32 and a reduced mass portion 34b that can be disposed along the rotational axis 18 between the first and second journal portions 30 and 32. The first journal portion 30 defines a first circumferentially extending bearing surface 36, while the second journal portion 32 defines a second circumferentially extending bearing surface 38.

The reduced mass portion 34b can be disposed axially between the first and second circumferentially extending bearing surfaces 36 and 38 and can include a body 40b and at least one stiffening structure 42b. The body 40b can be fixedly coupled to the first and second journal portions 30 and 32 and defines a third circumferentially extending bearing surface 44b that is concentric with the first and second circumferentially extending bearing surfaces 36 and 38. The at least one stiffening structure 42b can be fixedly coupled to the first and second journal portions 30 and 32 and can terminate radially inwardly of the first circumferentially extending bearing surface 36 such that a void space 48b is disposed between the first and second journal portions 30 and 32 at a location that is radially outwardly of the at least one stiffening structure 42b. In a cross-section of the balance shaft 10a taken perpendicular to the rotational axis 18, the void space 48b extends between the rotational axis 18 and the body 40b. The void space 48b can optionally extend about the at least one stiffening structure 42b and between the rotational axis 18 and the body 40b to form a window W that is disposed through the first journal 12b.

The rotational axis 18 can extend longitudinally between the body 40b and the at least one stiffening structure 42b. The at least one stiffening structure 42b can comprise a beam having a first surface 100 and a second surface 102 that is spaced more distantly from the rotational axis 18 than the first surface 100. In the example provided, the first and second surfaces 100 and 102 are parallel to one another, but it will be appreciated that the second surface 102 could be shaped differently. One benefit of the embodiment shown in FIGS. 12-16 is that it allows lubricant to readily drain from between the body 40b and the stiffening structure 42b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A balance shaft having first and second journals and at least one counterweight, the first and second journals defining a rotational axis, the at least one counterweight being fixedly coupled to the first and second journals; wherein the first journal defines a first journal portion, a second journal portion and a reduced mass portion disposed along the rotational axis between the first and second journal portions, the first journal portion defining a first circumferentially extending bearing surface, the second journal portion defining a second circumferentially extending bearing surface, the reduced mass portion having a body and a stiffening structure, the body being fixed to and spanning between the first and second journal portions, the body being shaped as a cylindrical segment having a third circumferentially extending bearing surface and an first medial surface, the first medial surface being offset from the rotational axis and intersecting the third circumferentially extending bearing surface, the stiffening structure being fixed to and spanning between the first and second journal portions, the stiffening structure being disposed radially inside of a cylindrically-shaped perimeter defined by the first, second and third circumferentially extending bearing surfaces, the stiffening structure having a second medial surface that is offset from the rotational axis such that the rotational axis is disposed between the body and the stiffening structure so that a void space is formed laterally through the first journal, the void space being bounded on four sides by the second medial surface of the stiffening structure, the first medial surface of the body, an interior surface of the first journal portion and an interior surface of the second journal portion.

2. The balance shaft of claim 1, wherein the first circumferentially extending bearing surface extends fully about the rotational axis.

3. The balance shaft of claim 2, wherein the second circumferentially extending bearing surface extends fully about the rotational axis.

4. The balance shaft of claim 1, wherein a portion of the first medial surface of the body and a portion of the second medial surface of the stiffening structure are parallel to one another.

5. The balance shaft of claim 4, wherein a portion of an outboard surface of the stiffening structure is parallel to the portion of the first medial surface of the body.

6. The balance shaft of claim 1, wherein the rotational axis and the center of gravity of the balance shaft are disposed in a plane, and wherein the plane is perpendicular to the first medial surface of the body, the inboard surface of the stiffening structure.

7. The balance shaft of claim 1, wherein the rotational axis and the center of gravity of the balance shaft are disposed in a plane, and wherein the interior surfaces of the first and second journal portions are perpendicular to the plane.

8. A balance shaft having first and second journals and at least one counterweight, the first and second journals defining a rotational axis, the at least one counterweight being fixedly coupled to the first and second journals; wherein the first journal defines a first journal portion, a second journal portion and a reduced mass portion disposed along the rotational axis between the first and second journal portions, the first journal portion defining a first circumferentially extending bearing surface, the second journal portion defining a second circumferentially extending bearing surface, the reduced mass portion having a body that is fixed to and spans between the first and second journal portions, the body having a third circumferentially extending bearing surface and an a medial surface, wherein the first journal has a cylindrically-shaped perimeter that is defined by the first, second and third circumferentially extending bearing surfaces, wherein the medial surface of the body is disposed between the rotational axis and the third circumferentially extending bearing surface, and wherein at least a portion of the medial surface of the body is concave in shape in a plane that is perpendicular to the rotational axis.

9. A balance shaft having first and second journals and at least one counterweight, the first and second journals defining a rotational axis, the at least one counterweight being fixedly coupled to the first and second journals;

wherein the first journal defines a first journal portion, a second journal portion and a reduced mass portion disposed along the rotational axis between the first and second journal portions, the first journal portion defining a first circumferentially extending bearing surface, the second journal portion defining a second circumferentially extending bearing surface, the reduced mass portion being disposed axially along the rotational axis between the first and second circumferentially extending bearing surfaces and including a body and a stiffening structure, the body being fixedly coupled to the first and second journal portions and defining a third circumferentially extending bearing surface that is concentric with the first and second circumferentially extending bearing surfaces, the stiffening structure intersecting the body and the first and second journal portions and terminating radially inwardly of the first circumferentially extending bearing surface such that a void space is disposed between the first and second journal portions at a location that is radially outwardly of the stiffening structure;

wherein the stiffening structure defines a first pocket, which is disposed adjacent the first journal portion, and a second pocket, which is disposed adjacent the second journal portion, and wherein the first and second pockets are spaced apart from one another along the rotational axis to form a land there between.

* * * * *

UNITED STATES PATENT AND TRADEMARK OFFICE
CERTIFICATE OF CORRECTION

PATENT NO. : 10,816,059 B2
APPLICATION NO. : 16/855057
DATED : October 27, 2020
INVENTOR(S) : Stephen A. Clark et al.

Page 1 of 1

It is certified that error appears in the above-identified patent and that said Letters Patent is hereby corrected as shown below:

On the Title Page

Column 1, Related U.S. Application Data (63), in Line 1, delete "15/981,762," and insert --15/984,762,-- therefor.

Signed and Sealed this
Nineteenth Day of October, 2021

Drew Hirshfeld
*Performing the Functions and Duties of the
Under Secretary of Commerce for Intellectual Property and
Director of the United States Patent and Trademark Office*